United States Patent
Nakajima

(10) Patent No.: US 10,035,901 B2
(45) Date of Patent: Jul. 31, 2018

(54) RUBBER COMPOSITION FOR USE IN TIRES

(71) Applicant: The Yokohama Rubber Co., LTD., Minato-ku, Tokyo (JP)

(72) Inventor: Miyuki Nakajima, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 110 days.

(21) Appl. No.: 15/106,250

(22) PCT Filed: Dec. 5, 2014

(86) PCT No.: PCT/JP2014/082223
§ 371 (c)(1),
(2) Date: Jun. 17, 2016

(87) PCT Pub. No.: WO2015/093316
PCT Pub. Date: Jun. 25, 2015

(65) Prior Publication Data
US 2017/0306131 A1    Oct. 26, 2017

(30) Foreign Application Priority Data
Dec. 18, 2013    (JP) .................................. 2013-261032

(51) Int. Cl.
C08L 9/00    (2006.01)
B60C 1/00    (2006.01)

(52) U.S. Cl.
CPC .............. C08L 9/00 (2013.01); B60C 1/0016 (2013.01); *C08L 2205/025* (2013.01); *C08L 2205/035* (2013.01)

(58) Field of Classification Search
CPC ....................................................... C08L 9/00
See application file for complete search history.

(56) References Cited

U.S. PATENT DOCUMENTS

| | | | |
|---|---|---|---|
| 7,649,043 B2 * | 1/2010 | Bergman | ................ C08L 21/00 152/510 |
| 2011/0144236 A1 | 6/2011 | Mihara | |

(Continued)

FOREIGN PATENT DOCUMENTS

| | | |
|---|---|---|
| JP | 2009-138157 | 6/2009 |
| JP | 2011-122057 | 6/2011 |

(Continued)

OTHER PUBLICATIONS

International Search Report for International Application No. PCT/JP2014/082223 dated Mar. 3, 2015, 4 pages, Japan.

*Primary Examiner* — Arrie L Reuther
(74) *Attorney, Agent, or Firm* — Thorpe North & Western

(57) ABSTRACT

A rubber composition for use in tires comprises: WT part(s) by weight of an aromatic modified terpene resin having a softening point of 100° C. or higher per 100 parts by weight of a diene rubber, the diene rubber containing a total of 50% by weight or greater but less than 90% by weight of a butadiene rubber and an emulsion-polymerized styrene butadiene rubber, wherein the butadiene rubber is contained in an amount of 35% by weight or greater but less than 65% by weight and the emulsion-polymerized styrene butadiene rubber is contained in an amount so that an amount of bonded styrene is 35% by weight or greater. In the rubber composition, the ratio of the compounded amount of the butadiene rubber (WB part(s) by weight) to the compounded amount of the aromatic modified terpene resin (WB/WT) is from 2.5 to 5.0.

5 Claims, 1 Drawing Sheet

(56) References Cited

U.S. PATENT DOCUMENTS

| | | |
|---|---|---|
| 2012/0077902 A1 | 3/2012 | Steiner |
| 2013/0158172 A1 | 6/2013 | Lopez |
| 2013/0331498 A1 | 12/2013 | Miyazaki |
| 2014/0171557 A1 | 6/2014 | Ringot |
| 2015/0126643 A1 | 5/2015 | Satou et al. |
| 2016/0075864 A1 | 3/2016 | Takeda |

FOREIGN PATENT DOCUMENTS

| | | | |
|---|---|---|---|
| JP | 2013-028720 | | 2/2013 |
| JP | 2013-526622 | | 6/2013 |
| JP | 2013-166865 | | 8/2013 |
| JP | 2013166865 A | * | 8/2013 |
| WO | WO 2011/141334 | | 11/2011 |
| WO | WO 2012/152696 | | 11/2012 |
| WO | WO 2013/133432 | | 9/2013 |
| WO | WO 2014/178431 | | 11/2014 |

\* cited by examiner

RUBBER COMPOSITION FOR USE IN TIRES

TECHNICAL FIELD

The present technology relates to a rubber composition for use in tires, and particularly relates to a rubber composition for use in tires, the rubber composition reducing rolling resistance and enhancing wet grip performance and tire durability of a pneumatic tire.

BACKGROUND ART

In recent years, there has been a demand for environmentally friendly pneumatic tires to prevent worsening of the global environment. Therefore, it is necessary to reduce the rolling resistance of tires and to enhance the fuel efficiency performance. As methods of reducing the rolling resistance, for example, reducing the compounded amount of carbon black in the rubber composition that constitutes the tire and use of a substance having a low glass transition temperature as a polymer have been known. However, although such a rubber composition can achieve the effect of reducing the rolling resistance, grip performance, particularly wet grip performance, which is an important basic characteristic of a tire may decrease, and tire durability, such as cut resistance and chipping resistance, may be deteriorated due to decrease in tensile elongation at break.

Japanese Unexamined Patent Application Publication No. 2009-138157A proposes to enhance both the fuel efficiency performance and the grip performance by a rubber composition for use in tires that uses a rubber having a low glass transition temperature as a polymer and that contains an aromatic modified terpene resin.

However, this rubber composition for use in tires has insufficient tire durability such as cut resistance and chipping resistance, and further enhancement of fuel efficiency performance is also demanded, and thus this rubber composition has room for improvement.

SUMMARY

The present technology provides a rubber composition for use in tires that reduces rolling resistance and enhances wet grip performance and tire durability of a pneumatic tire.

The rubber composition for use in tires of the present technology is a rubber composition comprising: WT part(s) by weight of an aromatic modified terpene resin having a softening point of 100° C. or higher per 100 parts by weight of a diene rubber, the diene rubber containing a total of 50% by weight or greater but less than 90% by weight of a butadiene rubber and an emulsion-polymerized styrene butadiene rubber, wherein the butadiene rubber is contained in an amount of 35% by weight or greater but less than 65% by weight and the emulsion-polymerized styrene butadiene rubber is contained in an amount so that an amount of bonded styrene is 35% by weight or greater. In the rubber composition, the ratio of the compounded amount of the butadiene rubber (WB part(s) by weight) to the compounded amount of the aromatic modified terpene resin (WB/WT) is from 2.5 to 5.0.

According to the rubber composition for use in tires of the present technology, since the diene rubber is formed from a butadiene rubber and an emulsion-polymerized styrene butadiene rubber, in which the amount of bonded styrene is 35% by weight or greater, and the total amount of these components are 50% by weight or greater but less than 90% by weight, and since the ratio of the compounded amount of the butadiene rubber (WB part(s) by weight) to the compounded amount of the aromatic modified terpene resin having a softening point of 100° C. or higher (WT part(s) by weight) (WB/WT) is set to 2.5 to 5.0, the rolling resistance can be reduced and the wet grip performance and the tire durability can be enhanced when a pneumatic tire is formed.

The rubber composition for use in tires of the present technology may contain from 50 to 120 parts by weight of a filler per 100 parts by weight of the diene rubber; and the filler may have 10% by weight or greater of silica having a CTAB (cetyl trimethylammonium bromide) specific surface area of 120 to 180 m²/g.

A pneumatic tire that comprises the rubber composition for use in tires of the present technology can reduce the rolling resistance and improve the wet grip performance and the tire durability.

Furthermore, the pneumatic tire of the present technology can be suitably used for light trucks.

DETAILED DESCRIPTION

Figure 1:
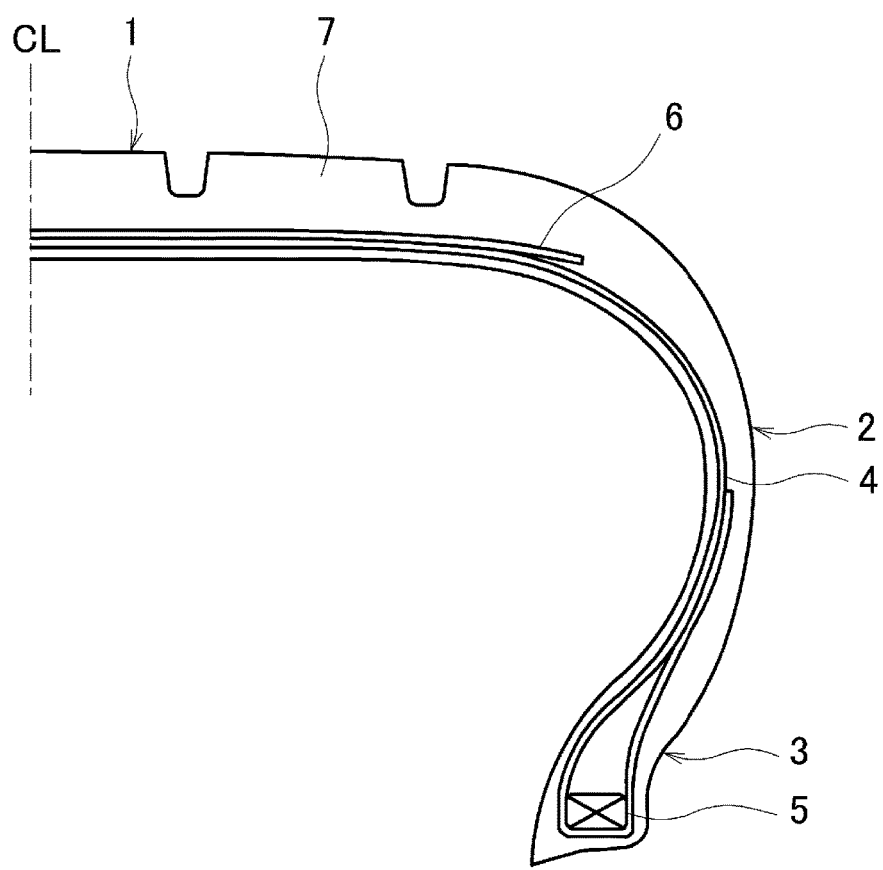
FIG. 1 is a cross-sectional view in a tire meridian direction that illustrates an example of an embodiment of a pneumatic tire in which a rubber composition for use in tires of the present technology is used.

The pneumatic tire illustrated in FIG. 1 comprises a tread portion 1, a sidewall portion 2, and a bead portion 3. A carcass layer 4 is mounted between the left and right bead portions 3 and 3, and each end of the carcass layer 4 is folded over from the inside to the outside of the tire around a bead core 5. A belt layer 6 is disposed on the outer side in the tire radial direction of the carcass layer 4 in the tread portion 1, and a tread rubber 7 is disposed on the outside of this belt layer 6. The rubber composition for use in tires of the present technology can be advantageously used in the tread rubber 7 and/or the sidewall portion 2. Of these, the rubber composition is preferably used in the tread rubber 7. Note that the pneumatic tire illustrated in FIG. 1 is an example of pneumatic tires used in passenger vehicles, light trucks, or the like; however, in addition to this embodiment, the rubber composition for use in tires of the present technology can be advantageously used in heavy duty pneumatic tires for trucks, buses, or the like.

In the rubber composition for use in tires of the present technology, the diene rubber must contain a butadiene rubber and an emulsion-polymerized styrene butadiene rubber having the amount of bonded styrene of 35% by weight or greater. As the butadiene rubber, any butadiene rubber that is regularly used in rubber compositions for use in tires can be used. The content of the butadiene rubber is 35% by weight or greater but less than 65% by weight, preferably from 35 to 62% by weight, more preferably from 35 to 55% by weight, and even more preferably from 35 to 50% by weight, per 100% by weight of the diene rubber. When the content of the butadiene rubber is less than 35% by weight, the effect of reducing rolling resistance and the effect of improving wear resistance cannot be obtained sufficiently. Furthermore, when the content of the butadiene rubber is 65% by weight or greater, wet grip performance will decline.

In the present technology, an emulsion-polymerized styrene butadiene rubber is used as the styrene butadiene rubber. By allowing the emulsion-polymerized styrene butadiene rubber to be contained, total balance of processability, physical properties, and cost of the rubber composition for use in tires becomes suitable.

As the emulsion-polymerized styrene butadiene rubber, the amount of bonded styrene thereof is set to 35% by weight or greater, preferably from 35 to 50% by weight, more preferably from 35 to 45% by weight. When the amount of bonded styrene is less than 35% by weight, wear resistance of the rubber composition for use in tires decreases, and thus rolling resistance becomes large when the composition is formed into a tire. In the present description, the amount of bonded styrene is measured using infrared emission spectroscopy (Hampton technique).

The content of the emulsion-polymerized styrene butadiene rubber is selected in a manner that the total amount of the emulsion-polymerized styrene butadiene rubber and the butadiene rubber described above is 50% by weight or greater but less than 90% by weight, and preferably from 60 to 75% by weight, per 100% by weight of the diene rubber. When the total amount of the butadiene rubber and the emulsion-polymerized styrene butadiene rubber having the amount of bonded styrene of 35% by weight or greater is less than 50% by weight, wear resistance of the rubber composition for use in tires decreases, and thus rolling resistance becomes large when a tire is formed.

In the rubber composition for use in tires of the present technology, besides the butadiene rubber and the emulsion-polymerized styrene butadiene rubber having the amount of bonded styrene of 35% by weight or greater, another diene rubber is contained in a range of greater than 10% by weight but 50% by weight or less, and preferably in a range of 25 to 40% by weight, per 100% by weight of the diene rubber. Examples of other diene rubbers include a natural rubber, isoprene rubber, solution-polymerized styrene butadiene rubber, emulsion-polymerized styrene butadiene rubber having the amount of bonded styrene of less than 35% by weight, butyl rubber, acrylonitrile butadiene rubber, and the like. Among these other diene rubbers, a natural rubber and emulsion-polymerized styrene butadiene rubber having the amount of bonded styrene of less than 35% by weight are preferable. In particular, an emulsion-polymerized styrene butadiene rubber having the amount of bonded styrene of less than 35% by weight is preferable and makes it possible to facilitate processing of the rubber composition for use in tires.

In the rubber composition for use in tires of the present technology, the wet grip performance is enhanced by compounding an aromatic modified terpene resin. This is because the aromatic modified terpene resin makes dispersibility of fillers, such as silica and carbon black, better and further enhances miscibility between the fillers and the diene rubber.

As the aromatic modified terpene resin, an aromatic modified terpene resin having a softening point of 100° C. or higher, and preferably from 120 to 170° C., is compounded. If the softening point of the aromatic modified terpene resin is lower than 100° C., the effect of improving wet performance cannot be sufficiently obtained. In the present description, the softening point of the aromatic modified terpene resin is measured in accordance with JIS (Japanese Industrial Standard) K 6220-1 (ring and ball method).

When the compounded amount of the butadiene rubber is WB part(s) by weight and the compounded amount of the aromatic modified terpene resin is WT part(s) by weight, the compounded amount of the aromatic modified terpene resin is adjusted in a manner that the ratio of these (WB/WT) is from 2.5 to 5.0, and preferably from 3.0 to 4.0. When the ratio of the compounded amount of the butadiene rubber to the compounded amount of the aromatic modified terpene resin (WB/WT) is less than 2.5, the effect of reducing rolling resistance cannot be obtained sufficiently. Furthermore, when the ratio of the compounded amounts (WB/WT) is greater than 5.0, the wet grip performance is deteriorated.

In the present technology, as the aromatic modified terpene resin, an aromatic modified terpene resin obtained by polymerizing a terpene such as α-pinene, β-pinene, dipentene, and limonene, and at least one aromatic compound selected from the group consisting of styrene, α-methylstyrene, and vinyl toluene can be advantageously used.

The rubber composition for use in tires of the present technology can enhance wet grip performance and tire durability while rolling resistance is reduced, by allowing a filler to be contained.

The compounded amount of the filler is preferably from 50 to 120 parts by weight, and more preferably from 60 to 90 parts by weight, per 100 parts by weight of the diene rubber. When the compounded amount of the filler is less than 50 parts by weight, the wet grip performance decreases. Furthermore, when the compounded amount of the filler is greater than 120 parts by weight, the effect of reducing rolling resistance cannot be sufficiently obtained.

As the filler, silica is preferable and can reduce the rolling resistance when a tire is formed. The compounded amount of the silica is preferably 10% by weight or greater, and more preferably from 10 to 40% by weight, in the total amount of the filler. When the compounded amount of the silica is less than 10% by weight, the effect of reducing rolling resistance cannot be sufficiently obtained.

Furthermore, in the silica, the CTAB specific surface area is preferably from 120 to 180 $m^2/g$, and more preferably from 140 to 170 $m^2/g$. When the CTAB specific surface area of the silica is less than 120 $m^2/g$, the wet performance is deteriorated and the wear resistance is also deteriorated. Furthermore, when the CTAB specific surface area of the silica is greater than 180 $m^2/g$, the effect of reducing rolling resistance cannot be sufficiently obtained. In the present description, the CTAB specific surface area of the silica is measured in accordance with JIS K6217-3.

In the present technology, as the type of the silica, a silica that is typically used in rubber compositions for use in tires such as, wet silica, dry silica, and surface-treated silica, can be used. The silica to be used can be appropriately selected from commercially available silica.

Furthermore, compounding a silane coupling agent along with the silica will lead to enhanced dispersibility of the silica in the diene rubber and therefore is preferable. The compounded amount of the silane coupling agent is preferably from 3 to 15% by weight, and more preferably from 4 to 10% by weight, with respect to the compounded amount of the silica. When the compounded amount of the silane coupling agent is less than 3% by weight, it will not be possible to sufficiently enhance the dispersibility of the silica. Furthermore, when the compounded amount of the silane coupling agent exceeds 15% by weight, the silane coupling agents will aggregate and condense, and the desired effects will not be able to be obtained.

The type of silane coupling agent to be used is not particularly limited, but sulfur-containing silane coupling agents are preferable. Examples of the sulfur-containing silane coupling agent include bis-(3-triethoxysilylpropyl) tetrasulfide, bis-(3-triethoxysilylpropyl)disulfide, 3-trimethoxysilylpropyl benzothiazole tetrasulfide, γ-mercaptopropyl triethoxysilane, 3-octanoylthiopropyl triethoxysilane, and the like.

As a filler, the rubber composition for use in tires of the present technology may also contain other fillers other than the silica. Examples of the other fillers include carbon black, clay, calcium carbonate, aluminum hydroxide, talc, mica, and the like. Among these, carbon black is preferable. By allowing carbon black to be contained, strength of the rubber composition can be enhanced, thereby enhancing tire durability when a tire is formed. One type of these other fillers can be used, or a plurality of types of these can be used in a combination.

The rubber composition for use in tires of the present technology may also contain various types of additives that are commonly used in rubber compositions, such as vulcanization or crosslinking agents, antiaging agents, and plasticizers. These additives may be kneaded according to any common method to form a rubber composition and may be used in vulcanization or crosslinking. The compounded amount of these additives may be any conventional amount, as long as the performance of the present technology is not impaired.

The rubber composition for use in tires can be produced by mixing each of the components described above using a commonly used rubber kneading machine, such as a Banbury mixer, a kneader, and a roller.

The rubber composition for use in tires of the present technology can constitute a tread portion and/or sidewall portion of a pneumatic tire. This rubber composition for use in tires is preferably used in at least one portion selected from these portions. Among these, the composition is preferably used to constitute a tread portion. A pneumatic tire in which the rubber composition for use in tires of the present technology is used for these portions can enhance fuel efficiency performance by reducing the rolling resistance and can enhance the cut resistance, chipping resistance, and wet grip performance to or beyond conventional levels.

The pneumatic tire of the present technology is preferably used as a pneumatic tire for use in light trucks. "Light truck" is also called "light-duty truck", and refers to a truck or truck-based vehicle with a payload capacity of less than 4,000 pounds (1,815 kg) based on a US classification for vehicles. For the pneumatic tire for light trucks, even higher level of tire durability, such as cut resistance and chipping resistance, is required compared to those for pneumatic tire for passenger vehicles. A pneumatic tire for light trucks, in which the rubber composition of the present technology is used in tread portion and/or sidewall portion, can reduce the rolling resistance and enhance the wet grip performance and the tire durability.

The present technology is further described below using examples. However, the scope of the present technology is not limited to these examples.

Examples

Components to be compounded other than sulfur and vulcanization accelerators were weighed according to each of the compositions for the 18 types of rubber compositions shown in Tables 1 and 2 (Working Examples 1 to 11 and Comparative Examples 1 to 7). These components and additives shown in Table 3 were kneaded in a 16 L Banbury Mixer for 5 minutes. Then, this mixture was discharged and cooled at room temperature. This mixture was fed to an open roll, and the sulfur and the vulcanization accelerator were then added to the mixture and mixed to prepare a rubber composition for use in tires. In Tables 1 and 2, since the styrene butadiene rubber E-SBR-2 contains an oil-extending component, net compounded amount of the SBR is shown in parenthesis. In Tables 1 and 2, WS refers to the net compounded amount of the styrene butadiene rubber E-SBR-2, WB refers to the compounded amount of the butadiene rubber, and WT refers to the compounded amount of the aromatic modified terpene resin. Furthermore, the compounded amount of the additives shown in Table 3 is shown in terms of "part(s) by weight" relative to 100 parts by weight of the diene rubber shown in Tables 1 and 2.

Using each of the obtained 18 types of rubber compositions, a vulcanized rubber sheet was produced in a mold having a predetermined shape by vulcanizing at 160° C. for 20 minutes. According to the following method, the rolling resistance and wear resistance performance were measured.

Rolling resistance: tan δ (60° C.)

The dynamic visco-elasticity of the obtained vulcanized rubber sheet was measured using a viscoelastic spectrometer, manufactured by Toyo Seiki Seisaku-sho, Ltd., under the following conditions: initial strain=10%, amplitude=±2%, and frequency=20 Hz, to determine tan δ at a temperature of 60° C. The obtained result is shown in "Rolling resistance" of Tables 1 and 2 as an index that takes the inverse of the value of Comparative Example 1 as 100. A higher value of this index indicates a smaller tan δ (60° C.), and therefore indicates lower rolling resistance and superior fuel efficiency performance when a tire is formed.

Wear Resistance

The amount of wear of the obtained vulcanized rubber sheet was measured in accordance with JIS K6264, using a Lambourn abrasion test machine (manufactured by Iwamoto Seisakusho Co. Ltd.) under the following conditions: temperature=20° C., load=49 N, slip rate 25%, and time=4 minutes. The obtained result is shown in "Wear resistance performance" of Tables 1 and 2 as an index that takes the inverse of the value of Comparative Example 1 as 100. A higher value of this index indicates higher wear resistance, and therefore indicates superior tire durability.

Using each of the obtained 18 types of rubber compositions in a tread portion, pneumatic tires for light trucks having a tire size of 265/70R17 were produced. These pneumatic tires were mounted on a light truck with a 6153 cc displacement, and wet grip performance was evaluated by a method described below.

Wet Grip Performance

A traveling test was performed on a wet road surface using a light truck on which the tires to be evaluated were mounted. The wet grip performance was evaluate by sensory evaluation by three members of trained panel. The obtained result is shown in "Wet grip performance" of Tables 1 and 2 as an index that takes the value of Comparative Example 1 as 100. A higher value of this index indicates superior wet grip performance on a wet road surface.

TABLE 1

| | | Comparative Example 1 | Comparative Example 2 | Comparative Example 3 |
|---|---|---|---|---|
| BR (WB) | Part by weight | 35.0 | 65.0 | 50.0 |
| E-SBR-1 | Part by weight | 40.0 | 10.0 | 35.0 |
| E-SBR-2 (WS) | Part by weight | 34.4 (25.0) | 34.4 (25.0) | 20.6 (15.0) |
| Carbon black | Part by weight | 75 | 75 | 75 |
| Silica-1 | Part by weight | 5 | 5 | 5 |
| Coupling agent | Part by weight | 0.5 | 0.5 | 0.5 |
| Aromatic modified terpene resin-1 (WT) | Part by weight | 20 | 20 | 8 |
| Aroma oil | Part by weight | 10 | 10 | 10 |

TABLE 1-continued

|  |  |  |  |  |
|---|---|---|---|---|
| Total of BR and E-SBR-2 (WB + WS) | Part by weight | 60.0 | 90.0 | 65.0 |
| Weight ratio (WB/WT) | — | 1.75 | 3.25 | 6.25 |
| Rolling resistance | Index value | 100 | 110 | 110 |
| Wet grip performance | Index value | 100 | 95 | 90 |
| Wear resistance | Index value | 100 | 110 | 115 |

|  |  | Comparative Example 4 | Comparative Example 5 | Comparative Example 6 |
|---|---|---|---|---|
| BR (WB) | Part by weight | 50.0 | 30.0 | 35.0 |
| E-SBR-1 | Part by weight | 35.0 | 45.0 | 55.0 |
| E-SBR-2 (WS) | Part by weight | 20.6 (15.0) | 34.4 (25.0) | 13.8 (10) |
| Carbon black | Part by weight | 75 | 60 | 60 |
| Silica-1 | Part by weight | 5 | 20 | 20 |
| Coupling agent | Part by weight | 0.5 | 0.5 | 0.5 |
| Aromatic modified terpene resin-1 (WT) | Part by weight | 25 | 12 | 14 |
| Aroma oil | Part by weight | 10 | 18 | 16 |
| Total of BR and E-SBR-2 (WB + WS) | Part by weight | 65.0 | 55.0 | 45.0 |
| Weight ratio (WB/WT) | — | 2.0 | 2.5 | 2.5 |
| Rolling resistance | Index value | 95 | 95 | 90 |
| Wet grip performance | Index value | 110 | 100 | 100 |
| Wear resistance | Index value | 115 | 100 | 95 |

|  |  | Comparative Example 7 | Working Example 1 | Working Example 2 |
|---|---|---|---|---|
| BR (WB) | Part by weight | 60.0 | 50.0 | 50.0 |
| E-SBR-1 | Part by weight | 5.0 | 35.0 | 35.0 |
| E-SBR-2 (WS) | Part by weight | 48.1 (35.0) | 20.6 (15.0) | 20.6 (15.0) |
| Carbon black | Part by weight | 60 | 75 | 60 |
| Silica-1 | Part by weight | 20 | 5 | 20 |
| Coupling agent | Part by weight | 0.5 | 0.5 | 1.80 |
| Aromatic modified terpene resin-1 (WT) | Part by weight | 20 | 20 | 20 |
| Aroma oil | Part by weight | 10 | 10 | 25 |
| Total of BR and E-SBR-2 (WB + WS) | Part by weight | 95.0 | 65.0 | 65.0 |
| Weight ratio (WB/WT) | — | 3.0 | 2.5 | 2.5 |
| Rolling resistance | Index value | 110 | 105 | 100 |
| Wet grip performance | Index value | 90 | 105 | 115 |
| Wear resistance | Index value | 110 | 120 | 110 |

TABLE 2

|  |  | Working Example 3 | Working Example 4 | Working Example 5 |
|---|---|---|---|---|
| BR (WB) | Part by weight | 50.0 | 50.0 | 50.0 |
| E-SBR-1 | Part by weight | 35.0 | 35.0 | 35.0 |
| E-SBR-2 (WS) | Part by weight | 20.6 (15.0) | 20.6 (15.0) | 20.6 (15.0) |
| Carbon black | Part by weight | 25 | 60 | 60 |
| Silica-1 | Part by weight | 20 | 20 |  |
| Silica-2 | Part by weight |  |  | 20 |
| Coupling agent | Part by weight | 1.8 | 1.8 | 1.8 |
| Aromatic modified terpene resin-1 (WT) | Part by weight | 20 | 20 | 20 |
| Aromatic modified terpene resin-2 (WT) | Part by weight |  |  |  |
| Aroma oil | Part by weight | 0 | 10 | 10 |
| Total of BR and E-SBR-2 (WB + WS) | Part by weight | 65.0 | 65.0 | 65.0 |
| Weight ratio (WB/WT) | — | 2.5 | 2.5 | 2.5 |
| Rolling resistance | Index value | 110 | 110 | 115 |
| Wet grip performance | Index value | 105 | 110 | 110 |
| Wear resistance | Index value | 125 | 120 | 105 |

|  |  | Working Example 6 | Working Example 7 | Working Example 8 |
|---|---|---|---|---|
| BR (WB) | Part by weight | 35.0 | 60.0 | 40.0 |
| E-SBR-1 | Part by weight | 45.0 | 30.0 | 50.0 |
| E-SBR-2 (WS) | Part by weight | 27.5 (20.0) | 13.8 (10.0) | 13.8 (10.0) |
| Carbon black | Part by weight | 60 | 60 | 60 |
| Silica-1 | Part by weight | 20 | 20 | 20 |
| Silica-2 | Part by weight |  |  |  |
| Coupling agent | Part by weight | 1.8 | 1.8 | 1.8 |
| Aromatic modified terpene resin-1 (WT) | Part by weight | 14 | 24 | 16 |
| Aromatic modified terpene resin-2 (WT) | Part by weight |  |  |  |
| Aroma oil | Part by weight | 16 | 6 | 14 |
| Total of BR and E-SBR-2 (WB + WS) | Part by weight | 55.0 | 70.0 | 50.0 |
| Weight ratio (WB/WT) | — | 2.5 | 2.5 | 2.5 |
| Rolling resistance | Index value | 105 | 120 | 105 |
| Wet grip performance | Index value | 115 | 105 | 115 |
| Wear resistance | Index value | 115 | 120 | 105 |

|  |  | Working Example 9 | Working Example 10 | Working Example 11 |
|---|---|---|---|---|
| BR (WB) | Part by weight | 60.0 | 50.0 | 50.0 |

TABLE 2-continued

| | | | | |
|---|---|---|---|---|
| E-SBR-1 | Part by weight | 10.0 | 35.0 | 35.0 |
| E-SBR-2 (WS) | Part by weight | 41.3 (30.0) | 20.6 (15.0) | 20.6 (15.0) |
| Carbon black | Part by weight | 60 | 60 | 60 |
| Silica-1 | Part by weight | 20 | 20 | 20 |
| Silica-2 | Part by weight | | | |
| Coupling agent | Part by weight | 1.8 | 1.8 | 1.8 |
| Aromatic modified terpene resin-1 (WT) | Part by weight | 24 | 10 | |
| Aromatic modified terpene resin-2 (WT) | Part by weight | | | 20 |
| Aroma oil | Part by weight | 6 | 20 | 10 |
| Total of BR and E-SBR-2 (WB + WS) | Part by weight | 90.0 | 65.0 | 65.0 |
| Weight ratio (WB/WT) | — | | 2.5 | 5.0 | 2.5 |
| Rolling resistance | Index value | 120 | 115 | 115 |
| Wet grip performance | Index value | 105 | 105 | 105 |
| Wear resistance | Index value | 120 | 105 | 115 |

Note that the types of raw materials used in Tables 1 and 2 are described below.

BR: Butadiene rubber; Nipol BR1220, manufactured by Zeon Corporation

E-SBR-1: Emulsion-polymerized styrene butadiene rubber; Nipol 1502, manufactured by Zeon Corporation; amount of bonded styrene: 23.5% by weight E-SBR-2: Emulsion-polymerized styrene butadiene rubber; Nipol 1739, manufactured by Zeon Corporation; amount of bonded styrene: 40.0% by weight; contained oil-extending component: 37.5 parts by weight Carbon black: N-134, manufactured by Tokai Carbon Co., Ltd. Silica-1: Zeosil 1165MP, manufactured by Rhodia (CTAB specific surface area: 155 m²/g)

Silica-2: Zeosil 115GR, manufactured by Rhodia (CTAB specific surface area: 110 m²/g)

Coupling agent: sulfur-containing silane coupling agent; Si69, manufactured by Evonik Degussa Aromatic modified terpene resin-1: YS Resin TO-125, manufactured by Yasuhara Chemical Co., Ltd.; softening point: 125° C.

Aromatic modified terpene resin-2: YS Resin TO-85, manufactured by Yasuhara Chemical Co., Ltd.; softening point 85° C.

Aroma oil: Extract 4S, manufactured by Showa Shell Sekiyu K.K.

TABLE 3

| Commonly added additives | | |
|---|---|---|
| Zinc oxide | 3.0 | Part by weight |
| Stearic acid | 2.0 | Part by weight |
| Antiaging agent | 2.5 | Part by weight |
| Sulfur | 2.0 | Part by weight |
| Vulcanization accelerator-1 | 2.0 | Part by weight |
| Vulcanization accelerator-2 | 0.5 | Part by weight |

The types of raw materials used as per Table 3 are described below.

Zinc oxide: Zinc Oxide #3, manufactured by Seido Chemical Industry Co., Ltd.

Stearic acid: Industrial stearic acid N, manufactured by Chiba Fatty Acid Co., Ltd.

Antiaging agent: Ozonon 6C, manufactured by Seiko Chemical Co., Ltd.

Sulfur: Golden Flower oil treated sulfur powder, manufactured by Tsurumi Chemical Industry Co., Ltd.

Vulcanization accelerator-1: Noccelar CZ-G manufactured by Ouchi Shinko Chemical Industrial Co., Ltd.

Vulcanization accelerator-2: PERKACIT DPG manufactured by Flexsys

As is clear from the results shown in Tables 1 and 2, all of the rubber compositions for use in tires of Working Examples 1 to 11 reduced the rolling resistance performance and enhanced the wet grip performance and the wear resistance performance compared to the rubber composition for use in tires of Comparative Example 1.

On the other hand, as is clear from the result shown in Table 1, the rubber composition for use in tires of Comparative Example 2 had poor wet grip performance since the rubber composition had the content of the butadiene rubber of 65% by weight or greater and the total content of the butadiene rubber and the emulsion-polymerized styrene butadiene rubber, in which the amount of bonded styrene was 35% by weight or greater, of 90% by weight or greater. The rubber composition for use in tires of Comparative Example 3 had poor wet grip performance since the weight ratio of the butadiene rubber to the aromatic modified terpene resin (WB/WT) was greater than 5.0. In the rubber composition for use in tires of Comparative Example 4, the rolling resistance was deteriorated since the weight ratio of the butadiene rubber to the aromatic modified terpene resin (WB/WT) was less than 2.5.

The rubber composition for use in tires of Comparative Example 5 could not enhance the wear resistance and exhibited poor rolling resistance performance since the content of the butadiene rubber was less than 35% by weight. The rubber composition for use in tires of Comparative Example 6 exhibited poor wear resistance and poor rolling resistance performance since the total content of the butadiene rubber (WB) and the styrene butadiene rubber E-SBR-2 (WS) (WB+WS) was less than 50% by weight. The rubber composition for use in tires of Comparative Example 7 exhibited poor wet grip performance since the total content of the butadiene rubber (WB) and the styrene butadiene rubber E-SBR-2 (WS) (WB+WS) was greater than 90% by weight.

The invention claimed is:
1. A rubber composition for use in a tire, the rubber composition comprising:
   100 parts by weight of a diene rubber and
   WT part(s) by weight of an aromatic modified terpene resin having a softening point of 100° C. or higher,
      the diene rubber containing a total of 50% by weight or greater but 90% by weight or less of an unmodified butadiene rubber and an emulsion-polymerized styrene butadiene rubber,
      the unmodified butadiene rubber being contained in an amount of 35% by weight or greater but less than 65% by weight and the emulsion-polymerized styrene butadiene rubber being contained in an amount so that an amount of bonded styrene is 35% by weight or greater; and
   a ratio of a compounded amount of the unmodified butadiene rubber (WB part(s) by weight) to a com- pounded amount of the aromatic modified terpene resin (WB/WT) being from 2.5 to 5.0.

2. The rubber composition for use in a tire according to claim 1, further comprising from 50 to 120 parts by weight of a filler per 100 parts by weight of the diene rubber; and the filler has 10% by weight or greater of silica having a CTAB specific surface area of 120 to 180 $m^2/g$.

3. A pneumatic tire comprising the rubber composition for use in a tire described in claim 1.

4. The pneumatic tire according to claim 3, wherein the pneumatic tire is a tire for a light truck.

5. The rubber composition for use in a tire according to claim 1, wherein the diene rubber contains a total of 60% by weight or greater but 90% by weight or less of the unmodified butadiene rubber and the emulsion-polymerized styrene butadiene rubber.

* * * * *